May 21, 1968     K. R. BANGERTER     3,384,343
AIR TOOL SPEED CONTROL
Filed Feb. 13, 1967
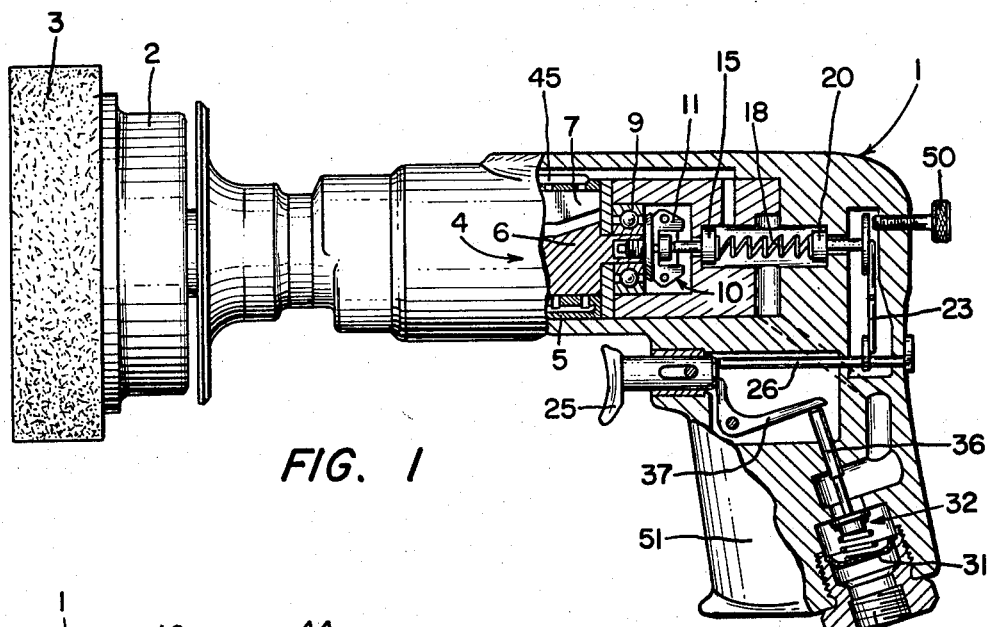
FIG. 1
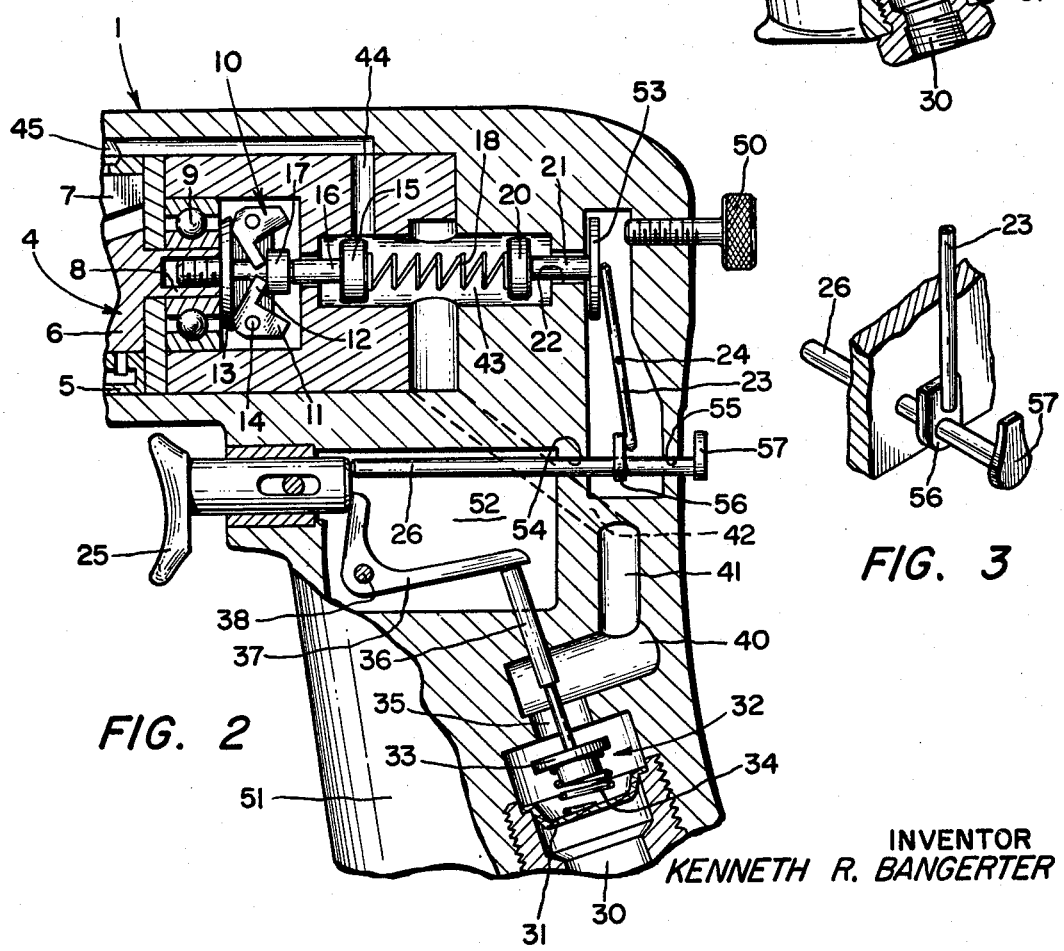
FIG. 2
FIG. 3
INVENTOR
KENNETH R. BANGERTER United States Patent Office 3,384,343
Patented May 21, 1968

3,384,343
AIR TOOL SPEED CONTROL
Kenneth R. Bangerter, Ithaca, N.Y., assignor to Ingersoll-Rand Company, New York, N.Y., a corporation of New York
Filed Feb. 13, 1967, Ser. No. 615,797
11 Claims. (Cl. 253—2)

ABSTRACT OF THE DISCLOSURE

A speed control for air driven power tools such as grinders, saws, hoists and the like. There is a governor controlled valve which limits the maximum speed of the motor. A trigger operated valve is placed in the supply line. A control piston may be either connected to the trigger or independently controlled to control the governor valve to thereby vary the speed of the motor.

This invention relates to a speed control for a fluid motor and, in particular, a speed control for air driven power tools such as saws, grinders, hoists and the like.

In prior air powered tools such as grinders, saws, hoists and the like, speed control has been a problem. Simple governor valves have been used to control tool speed but these merely limit the maximum speed of the tool and do not allow variation in speed. Although adjustable governors are known, as used in power tools, they do not allow quick variations in speed. In some tools speed control is achieved by using a variable restriction or throttle valve to vary air flow and thus speed. When torque increases, the operator must increase the air flow in order to maintain speed. If the speed is to be increased while the torque remains constant, the operator must increase air flow. When torque is high, it may be necessary to operate at full air pressure. If the torque suddenly decreases, the motor will tend to overspeed and the operator will be unable to decrease the air supply quick enough to prevent this overspeeding. The time required to vary speed depends on the skill of the operator.

It is therefore the principal object of this invention to provide an air tool speed control which allows the operator to control speed simply and quickly.

It is another object of this invention to provide an air tool speed control which eliminates overspeeding yet allows the speed to be varied.

In general, these objects are carried out by providing a power tool having a casing, a fluid motor mounted within the casing and a conduit for supplying fluid under pressure to the motor. There is provided valve means for opening and closing the supply conduit. Trigger means are provided for actuating this valve and a governor limits the maximum speed of the motor. There are means operable from outside the casing for controlling the governor to vary the maximum speed of the motor.

The foregoing and other objects will become apparent from the following description and drawings in which:

FIG. 1 is an overall view of a power tool employing one embodiment of this invention;

FIG. 2 is a detail of a portion of FIG. 1 showing the control of this invention in a different position; and FIG. 3 is a detail of a portion of this invention.

The power tool of this invention includes a casing 1 housing a fluid motor 4 which is illustrated as a vane type air motor but may be any suitable fluid motor. Although I have shown a grinder as illustrative of this invention, it is not intended that the invention be limited by any particular type of power tool. The grinder includes a workhead 2, a grinding disc 3 and a handle 51. The motor 4 includes a stator 5 and a rotor 6 having a plurality of vanes 7. The rotor 6 is connected through a suitable mechanical coupling to rotate the workhead 2. The rear of the rotor 6 has an extension 8 which is mounted in a bearing 9. A governor generally indicated at 10 is secured to the extension 8 of the rotor 6. This governor is of any suitable type but I prefer one having governor weights 11 with arms 12. The weights 11 are secured to a mounting bracket 13 by pivots 14.

A governor valve is provided and includes a piston member 15, valve stem 16, and a plate member 17 which is contacted by the arms 12 of the weights 11. The governor valve is biased towards the motor 4 by a spring 18. The governor 10 and governor valve operate in the usual manner. When the speed of the motor increases, centrifugal force causes the weights 11 to pivot outwardly on pivots 14 and cause the arms 12, plate 17, and piston 15 to move to the right, when looking at the drawings, against the spring 18.

Air under pressure is supplied from a suitable source through an inlet 30 in the tool handle 51. There is a filter 31 to clean dirt and other foreign matter from the air. An on-off valve generally indicated at 32 is provided to control the flow of air into the tool. This on-off valve is conventional and includes a plate member 33 which is biased closed by a spring 34 to cover a passage 35. A valve actuating stem 36 is fixed to the valve plate 33 and engages one arm of a bell crank lever 37 which is mounted in cavity 52 and pivoted at 38. The other arm of the bell crank is engaged by a trigger 25 which is reciprocably mounted in the casing of the tool in the usual manner. Although an on-off valve has been shown, a variable type valve may be used to provide additional flexibility.

When the trigger 25 is depressed, the valve 32 is opened. Since this valve is of the on-off type, when it is open, full air pressure passes through inlet 30, passage 35, chambers 40 and 41 into conduit 42. The air then passes into governor valve chamber 43, conduit 44, and passages 45 into stator 5 to operate the air motor 4. The air motor will then build up speed and the centrifugal force swings governor weights 11 outwardly. As the weights 11 move outwardly, arms 12 engage plate 17 which acts on plunger 16 and piston 15. As speed increases the piston 15 moves to the right in the chamber 43, as viewed in the drawings, and closes the conduit 44 to thereby decrease the supply of air to the air motor and limit the maximum speed obtainable by the motor.

An increase in torque within the capacity of the motor 4 and air pressure does not cause a decrease in speed. As the torque increases, motor speed will tend to decrease and the piston will move to the left, as viewed in the drawings. This allows more air to reach the motor 4 and thereby maintain speed. When torque decreases the motor will not overspeed because the governor valve will automatically close off passage 44 and limit motor speed.

By this invention, I have provided a control which allows the maximum speed obtainable by the motor to be varied without taking the tool apart and without requiring the operator to vary air flow to the tool. In order to accomplish this function, I have provided a piston 20 which is slidably mounted in the governor valve chamber 43 and is biased rearwardly by the spring 18. A plunger 21 is secured to or integral with the piston 20 and extends through a passage 22 in the casing. An end plate 53 is secured to the end of the plunger 21. The lower portion of the plate 53 is engaged by a lever 23 pivoted at 24.

A lever arm 26 is provided which at one end is in contact with the trigger 25. The arm 26 is guided by passages 54 and 55 in the casing. Intermediate the passages 54 and 55, a plate member 56 is secured to the arm 26 and a handle 57 is secured to the end of the arm 26. The arm 26 is rotatable in the passages 54 and 55 so that when the plate 56 is in the position shown in FIG. 3, the lever arm 23 is engaged by the plate 56. In this position when the trigger is depressed and the arm 26 moves rearwardly, the plate 56 causes the arm 23 to pivot about point 24 to apply a force to the plunger 21 and tend to move the piston 20 to the left as viewed in the drawings. The force on the piston 20 is transmitted through spring 18 to the piston 15 of the governor valve. The governor must now exert a greater force on the plunger 16 to move the piston 15 to the right to block the passage 44 and limit the speed of the motor. Since this force must be greater, the motor speed necessary to close the port 44 must also be greater. The more the operator depresses the trigger 25, the greater the speed obtainable.

Should it be desired to use the tool where a constant speed is necessary or desirable without the operator holding the trigger 25 steady, I have provided a constant speed control. In order to operate the tool of this invention at a constant speed, the handle 57 on the arm 26 is rotated 90°. This causes the plate member 56 to be rotated so that it no longer engages the lever arm 23. When the trigger is depressed, the valve 32 admits air but the arm 26 merely moves. No force is transmitted to the piston 20 to control speed. Thus, the speed of the motor is controlled exclusively by the governor.

In order to increase the moximum steady speed at which the tool will operate, I provide a speed control knob 50. This knob is threaded in the casing and as it is moved in, will contact the upper portion of the plate 53. The more knob 50 is screwed in, the more plate 53, plunger 21 and piston 20 will move to the left. This applies a constant force through spring 18 to the piston 15 and thus increases the maximum constant speed of the motor.

It can therefore be seen that the maximum speed obtainable by the air tool while using this invention can be greater than if this invention were not used and, at the same time, the operator has finger tip control over the speed of the tool regardless of torque requirement. If the torque on the motor is suddenly increased, speed may be maintained by depressing the trigger further. If torque suddenly decreases, the motor will not overspeed. This control is particularly important in tools such as a grinder where an operator may apply too much pressure to the workpiece and thereby cause burning. It is also important in a tool such as a hoist where a load will be moved slowly through a narrow passage and the speed can be increased quickly to lift the load at an economical rate. Additionally, this invention allows control of the constant speed obtainable.

It will be seen from the foregoing description that the objects of this invention have been carried out. It is intended that the foregoing description be merely that of a preferred embodiment and that the invention not be limited in any way except by that which is within the scope of the appended claims.

I claim:
1. A power tool comprising:
   a casing;
   a fluid motor mounted within said casing;
   a conduit for supplying fluid under pressure to said motor;
   valve means for opening and closing said conduit;
   means for actuating said valve means;
   a governor mounted within said casing for limiting the speed obtainable by said motor; and
   means selectively responsive to said actuating means for controlling said governor to vary the speed obtainable by said motor.

2. The power tool of claim 1 wherein said governor includes a spring biased valve responsive to the speed of said motor for varying the amount of fluid supplied to said motor and said governor controlling means includes means for increasing the biasing force applied to said valve to increase the speed obtainable by the motor.

3. The power tool of claim 1 wherein said valve means is an on-off valve.

4. The power tool of claim 1 wherein said governor controlling means is connected to said actuating means by mechanical linkages and further including means for disconnecting said actuating means from said governor controlling means.

5. The power tool of claim 4 wherein said valve means is an on-off valve and said actuating means is a trigger operatively connected to said on-off valve, said governor includes a spring biased valve responsive to the speed of the motor for varying the amount of fluid supplied to said motor and said governor controlling means includes a lever actuated piston connected to said trigger by said mechanical linkages whereby actuation of said trigger varies the biasing force of said spring to thereby vary the speed obtainable by said motor.

6. The power tool of claim 1 wherein said governor controlling means includes means for varying the constant speed of said motor.

7. A speed control for a fluid motor comprising:
   a conduit for supplying fluid under pressure to said motor;
   valve means for opening and closing said conduit;
   means for actuating said valve means;
   a governor responsive to said motor for limiting the maximum speed of said motor; and
   means selectively responsive to said actuating means for controlling said governor to vary the speed of said motor.

8. The speed control of claim 7 wherein said valve means is an on-off valve.

9. The speed control of claim 8 wherein said governor includes a spring biased valve responsive to the speed of said motor for varying the amount of fluid supplied to the motor.

10. The control of claim 9 wherein said governor controlling means is a lever actuated piston selectively connected to said actuating means whereby actuation of said actuating means varies the biasing force of said spring to thereby vary the speed obtainable by the motor.

11. The speed control of claim 10 further including means for disconnecting said actuating means from said governor controlling means to allow said motor to operate at a substantially constant speed.

References Cited

UNITED STATES PATENTS

| | | | |
|---|---|---|---|
| 2,216,416 | 10/1940 | Mader | 170—160.2 X |
| 2,556,719 | 6/1951 | Cushman | 170—160.2 X |
| 2,974,553 | 3/1961 | Donowick | 253—2 X |
| 2,977,931 | 4/1961 | Schott | 253—59 |

FOREIGN PATENTS

| | | |
|---|---|---|
| 820,428 | 11/1951 | Germany. |
| 545,651 | 6/1942 | Great Britain. |

EVERETTE A. POWELL, JR., *Primary Examiner.*